Dec. 25, 1951 C. E. ADAMS ET AL 2,580,062
HYDRAULIC PRESS WITH SERVO CONTROL
Filed May 11, 1949 5 Sheets-Sheet 1

INVENTORS
CECIL E. ADAMS
BY VICTOR V. BLASUTTA
HENRY V. MOG

Herschel C. Omohundro
attorney

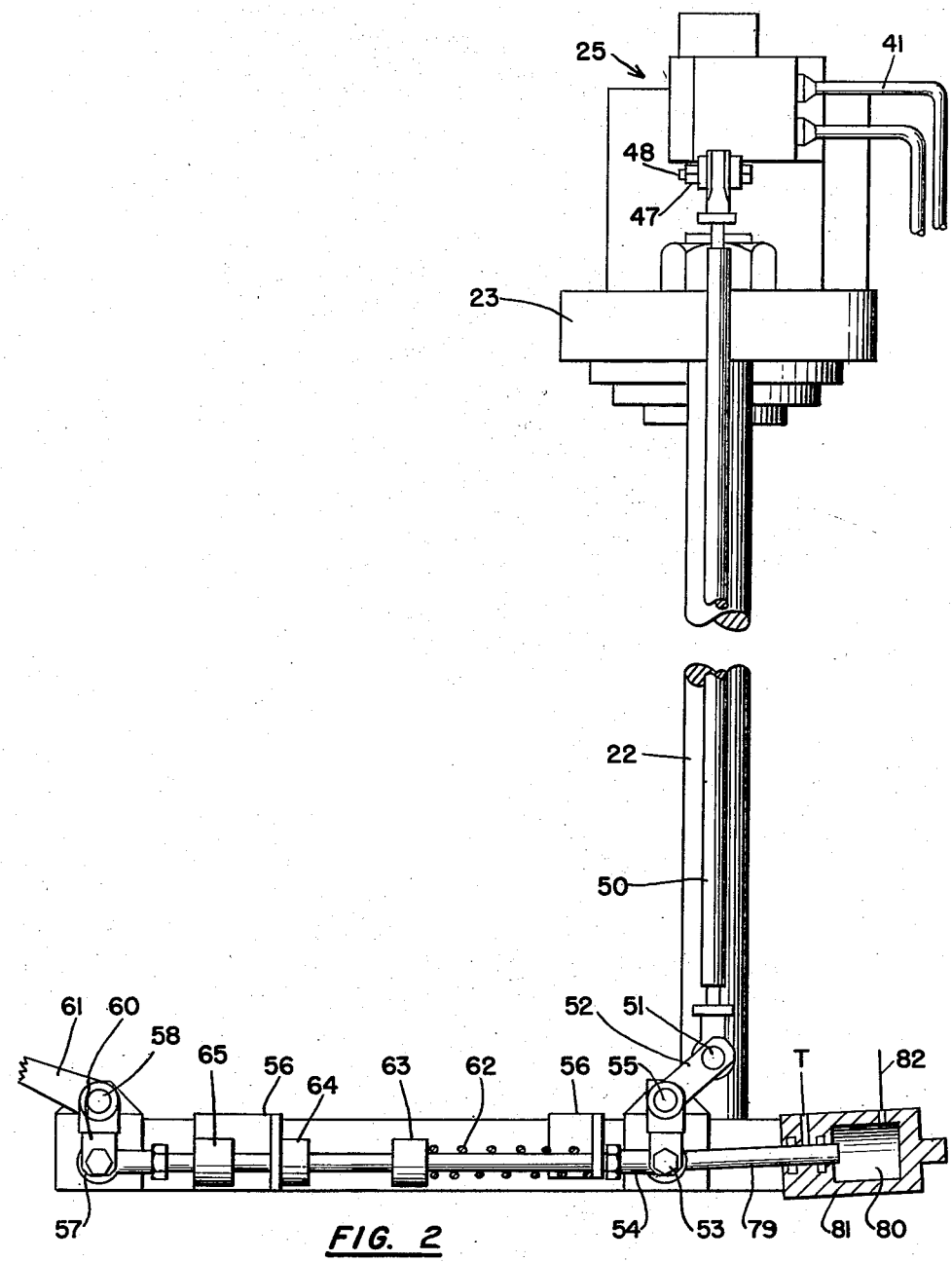

Dec. 25, 1951     C. E. ADAMS ET AL     2,580,062
HYDRAULIC PRESS WITH SERVO CONTROL
Filed May 11, 1949     5 Sheets-Sheet 3

INVENTORS
CECIL E. ADAMS
VICTOR V. BLASUTTA
HENRY V. MOG
BY Herschel C. Omohundro
attorney INVENTORS
CECIL E. ADAMS
VICTOR V. BLASUTTA
HENRY V. MOG
BY Herschel C. Omohundro
attorney

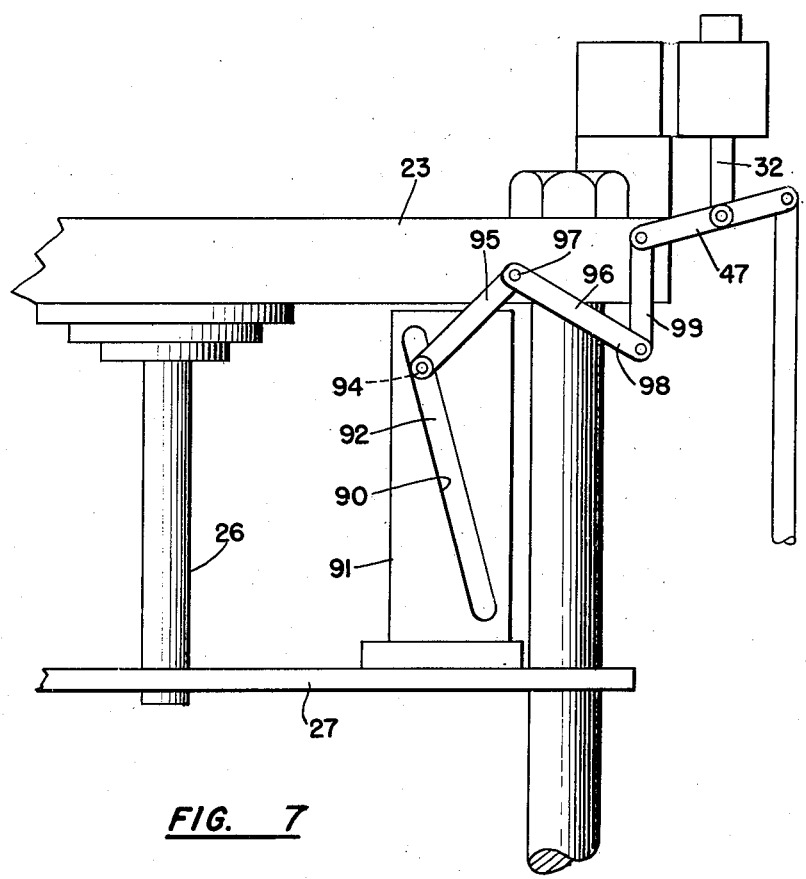

UNITED STATES PATENT OFFICE 2,580,062

HYDRAULIC PRESS WITH SERVO CONTROL

Cecil E. Adams, Victor V. Blasutta, and Henry V. Mog, Columbus, Ohio, assignors to The Denison Engineering Company, Columbus, Ohio, a corporation of Ohio Application May 11, 1949, Serial No. 92,554

11 Claims. (Cl. 121—41)

This invention relates generally to hydraulic apparatus and more particularly to hydraulic presses and control mechanisms therefor, an object of the invention being to provide a press which is especially applicable for use in the glass industry to press articles from glass while in a plastic state, the force required being furnished by hydraulic pressure but under complete control of the operator through a novel valve mechanism which simulates a manual operation as to the operator's sense of feeling without requiring him to expend excessive energy.

Another object of the invention is to provide a control mechanism for a hydraulic ram, which mechanism includes a slave valve or one responsive in part to the action of the hydraulic ram whereby a manual control element must be continuously manipulated to effect continuous operation of the ram.

Still another object of the invention is to provide a novel control mechanism for a fluid motor having a movable element, the control mechanism having a valve with a movable member and a manually operated handle, the latter being movable to effect the movement of the valve member and consequent movement of the motor element, the movement of the latter being transmitted back to the valve member to effect reverse movement thereof whereby the movement of the motor element will be discontinued.

A further object of the invention is to provide a hydraulic press having a ram and a control mechanism, such mechanism including a valve and a control handle, there being a motion transmitting mechanism between the handle and the valve and between the ram and the valve, the motion transmitting mechanisms serving to move a movable element of the valve in opposite directions whereby movement of the control handle in the one direction will cause movement of a ram in a certain direction and this movement will be transmitted to the movable element of the valve to counteract movement thereof by the control handle, the sequence of the operations of this control handle and the ram being such that they take place almost simultaneously.

A still further object of the invention is to provide a press having a ram and a control mechanism with a movable control handle, the handle being movable up and down to cause similar movement of the ram, the control mechanism including a four-way valve which has a movable element normally disposed in a position to cause the ram to remain at rest, there being motion transmitting mechanisms between the movable element of the valve and the control handle and between the ram and the movable element of the valve so that when the ram moves in response to the movement of the control handle, there will be a tendency for the valve to close, thus requiring the continued movement of the control handle to effect continued movement of the ram.

It is another object of the invention to so form the motion transmitting mechanism between the movable valve element and the control handle that the ratio of ram movement to movement of the control handle will constantly change as the control handle is moved whereby the motion of the control handle necessary to effect movement of the ram after the work has been engaged by the forming tool will be materially greater than the movement of the control handle during the initial portion of the ram stroke thus providing the operator with a more sensitive control of the ram during the critical forming period.

It is a further object of the invention to provide the motion transmitting mechanism between the control handle and the valve with means for resisting movement of the control handle, the resistance being increased as the force of the ram increases so that the operator will be enabled through his sense of feeling, to determine the force exerted on an article undergoing formation.

It is an object of the invention to provide a hydraulic press with a slave valve control mechanism, the control mechanism including a four-way valve with a spool element normally disposed in position to cause the ram of the press to remain idle, the control mechanism also having a movable actuating handle and motion transmitting mechanism between the spool of the valve mechanism and said actuating handle, and between the spool and the ram, the latter motion transmitting mechanism including a rack connected for movement with the ram, a floating support including a pinion operated by the rack and a lever pivotally mounted on the floating support and connected with the spool of the four-way valve, this lever also being pivotally connected with the motion transmitting mechanism between the valve spool and the operating lever, movement of the latter causing the lever connected with the valve spool to swing about the floating support in one direction to move said valve spool and the ram, movement of the ram causing the lever to swing about the floating support in the other direction to move the valve spool in the opposite direction and interrupt ram movement.

It is another object of the invention to provide different forms of motion transmitting mechanism between the press ram and the control valve.

Further objects and advantages of the present invention will be apparent from the following description, reference being had to the accompanying drawings wherein a preferred form of embodiment of the invention is clearly shown.

In the drawings:

Fig. 2 is a side elevation of the press shown in Fig. 1, the operating lever and control mechanism being illustrated in the positions occupied when the press is idle;

Figure 6:
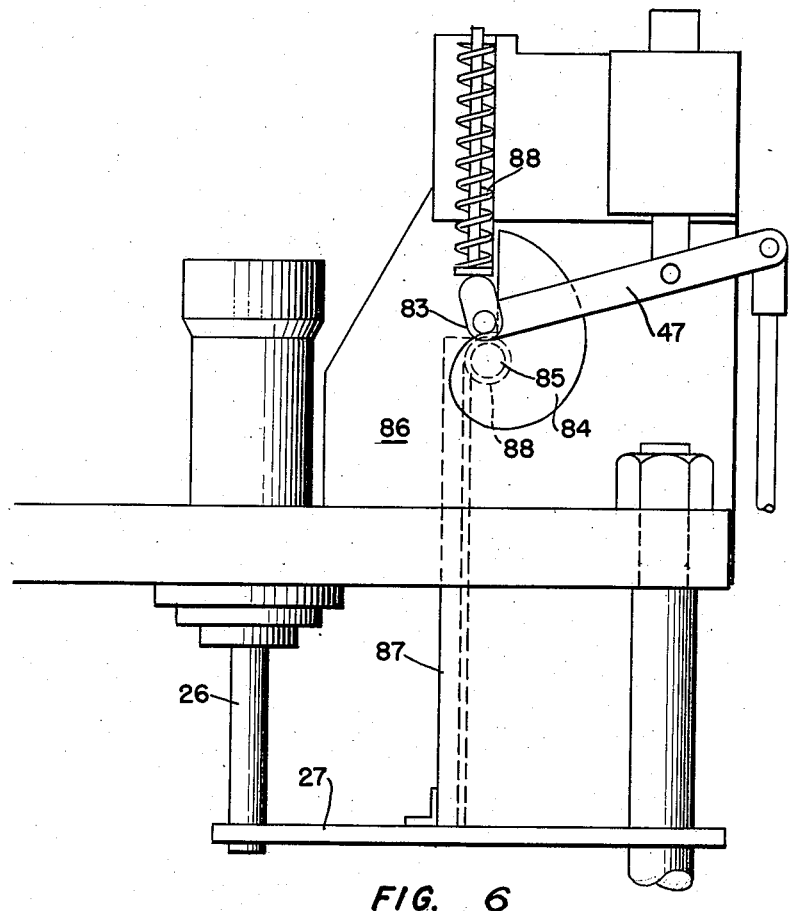
Figure 8:
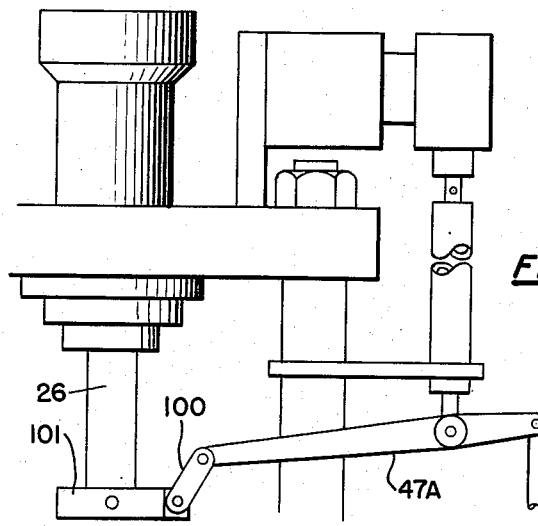

Figs. 6, 7, and 8 are front elevational views of modified forms of control mechanisms.

Referring more particularly to the drawings, numeral 20 designates a hydraulic press, which in this instance includes a base 21, spaced strain rods 22, a head 23 supported by the strain rods 22, the head in turn supporting a power cylinder 24. The head also supports a control mechanism, designated generally by the numeral 25, which is used to control the movements of a ram 26, which depends from the power cylinder through the head 23 into the space between the head and the base 21. The ram 26 carries an arm 27 which extends laterally to and surrounds one of the strain rods 22, this arm serving to prevent the rotation of the ram. Arm 27 slides on the strain rod 22, so that it moves in unison with the ram.

Figure 5:
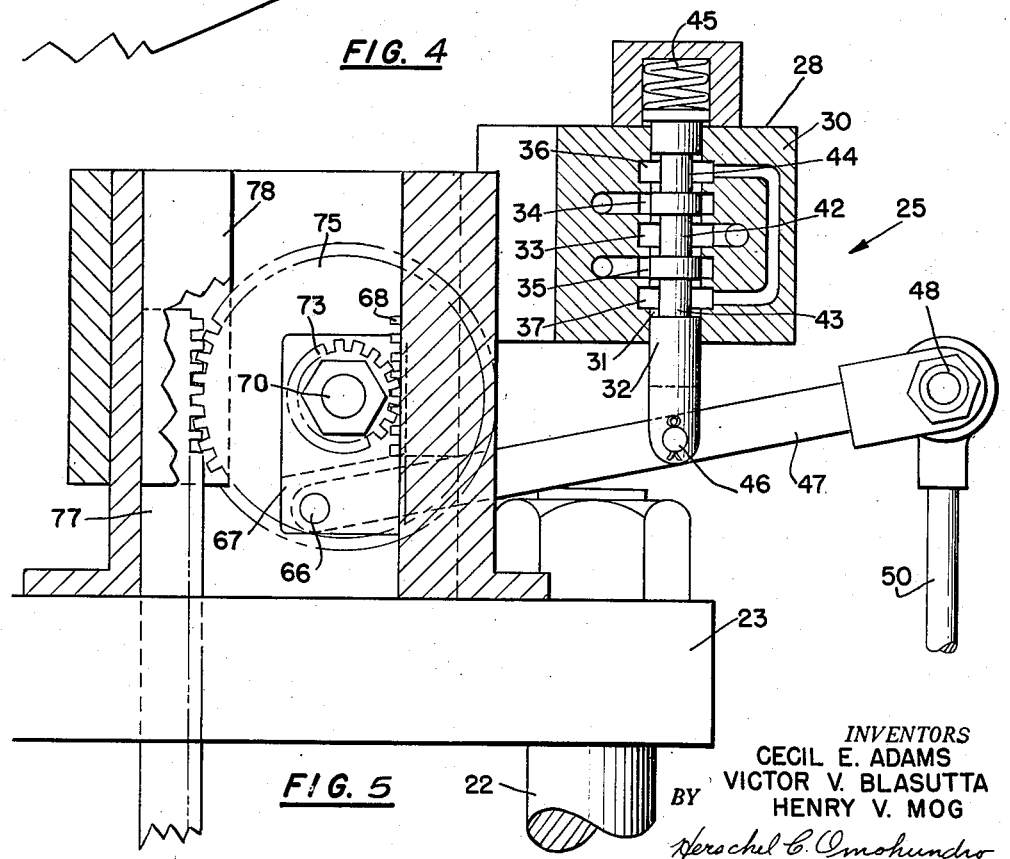
Fig. 5 is a detail vertical sectional view taken through the control mechanism on the plane indicated by the line V—V of Fig. 4.

The control mechanism 25 includes a four-way valve 28 having a body 30 provided with a central bore 31 for the slidable reception of a valve spool 32. At points spaced longitudinally of the bore 31, the body 30 is provided with annular grooves 33 to 37, inclusive, the groove 33 being connected with a suitable source (not shown) of fluid pressure. Grooves 34 and 35 are connected with the upper and lower ends of the power cylinder 24 by conduits 38 and 40 respectively, while grooves 36 and 37 are connected with one another and with a reservoir (not shown) by a conduit 41. Valve spool 32 includes a plurality of annular grooves 42, 43, and 44, which serve to connect certain of the grooves in the body depending upon the position of the spool 32 in the bore 31. Under normal conditions, the spool is held in the position shown in Fig. 5, wherein the grooves 34 and 35 do not communicate with any of the other grooves. The spool is urged towards this position by a coil spring 45 disposed in a socket in the upper end of the valve body or cap secured thereto.

The lower end of the valve spool 32 is pivotally connected as at 46 to the intermediate portion of a lever 47, one end of the lever being pivoted as at 48 to the upper end of a push rod 50. The lower end of the rod 50 is pivoted as at 51 to one arm of a bell crank 52, the other arm of this member being pivoted as at 53 to a sliding bar 54. The bell crank 52 is pivoted as at 55 on a support carried by the base 21. The bar 54 is supported for longitudinal movement by bell crank 52 and a second bell crank 57 mounted as at 58 for pivotal movement on the base. Bar 54 is connected to one arm 60 of the bell crank 57, the other arm 61 projecting forwardly beyond the end of the base and serving as an operating handle for the control mechanism. A coil spring 62 surrounds the bar 54 and is disposed between a collar 63 on the bar and one of the brackets 56. This spring tends to maintain the control handle in a predetermined, initially elevated position, shown in Fig. 2, in which position a collar 64 on bar 54 engages a bracket 56 secured to the base and through which the rod projects. The collar 64 stops the forward motion of the bar 54 by the spring 62 and determines the normal elevated position of the handle 61. By stopping the handle 61 in its upward movement, the collar 64 also stops the ram in its retraction. A second collar 65 secured on the bar 54 in spaced relation from the collar 64, serves to limit the rearward movement of bar 54 as well as the downward movement of handle 61 and the extension of ram 26.

Figure 1:
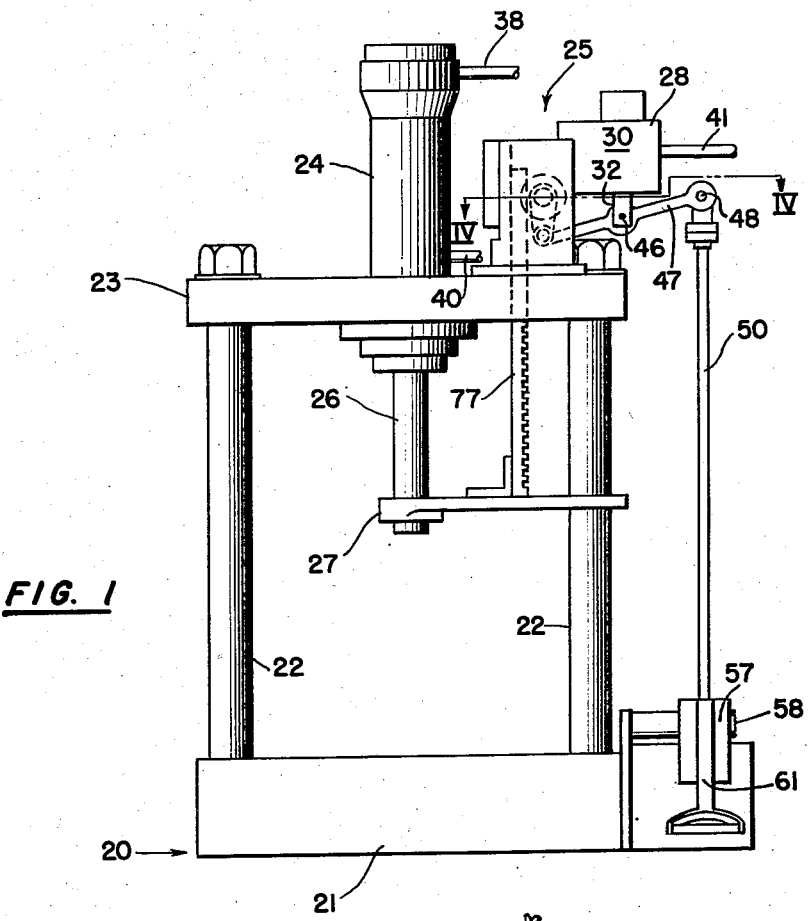
Fig. 1 is a front elevational view of a hydraulic press formed in accordance with the present invention.
Figure 3:
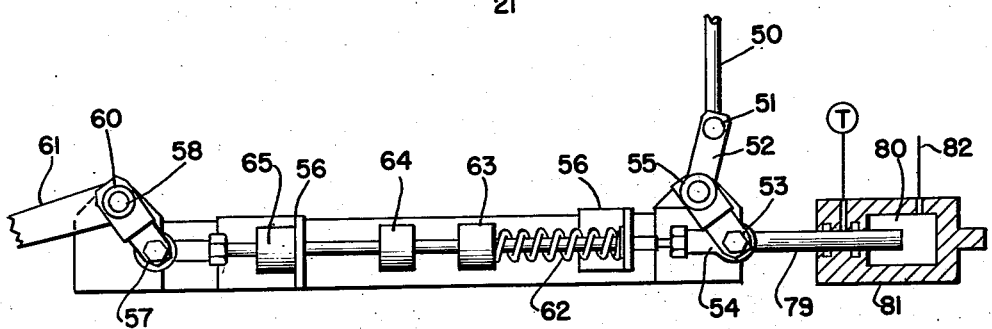
Fig. 3 is a view partly in side elevation and partly in vertical longitudinal section of a portion of the operating lever and control mechanism in the positions occupied when the press ram is fully extended.
Figure 4:
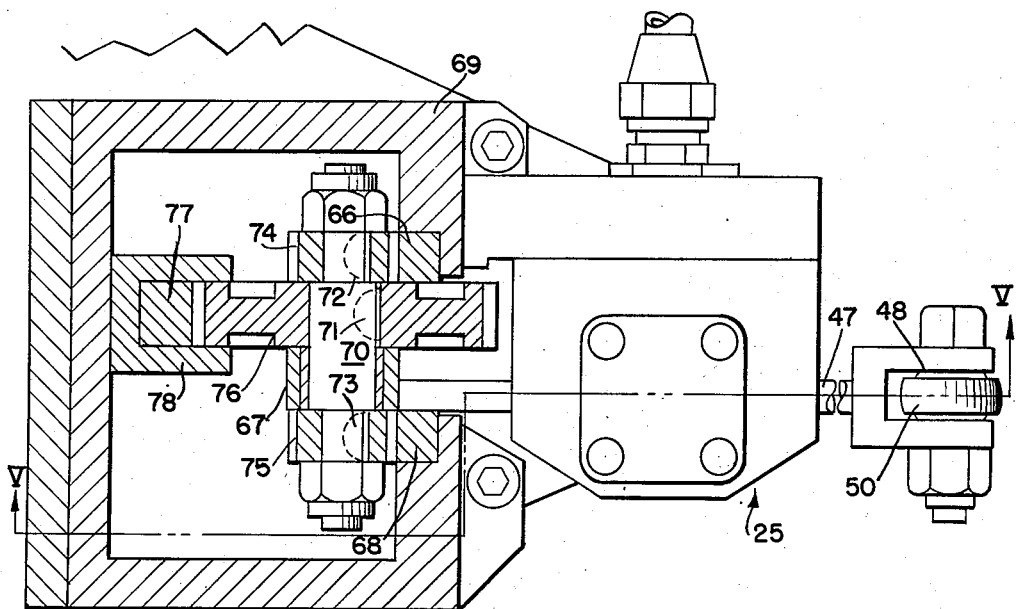
Fig. 4 is a horizontal sectional view with parts in plan of the control valve mechanism, the plane of this section indicated by the line IV—IV of Fig. 1.

It will be seen from Fig. 2 that if the outer end of the control handle 61 is depressed, the bar 54 will be moved lengthwise toward the right as viewed in Fig. 2, which will cause the bell crank 52 to move in a counter-clockwise direction. This motion will be transmitted by the rod 50 to the outer end of the lever 47, causing this lever to swing in an upward direction about a pivot 66 employed to pivotally connect the lever 47 to a block 67, this block being supported for vertical movement along racks 68 fixed to a support 69. The block 67 forms a floating support for the left end of the lever 47, as viewed in Fig. 4. The block 67 is provided with a shaft 70 to which are keyed as at 71, 72, and 73, a plurality of pinions 74, 75, and 76. Pinions 74 and 75 are duplicates and have their teeth arranged in meshing relationship with the racks 68. Pinion 76 is of larger size and has its teeth meshing with another rack 77, which is guided for vertical movement by a channel 78, the lower end of the rack 77 being connected with the arm 27.

It will be seen that as the ram 26 moves up or down, the rack 77 will do likewise causing pinion or gear 76 to revolve. Since this gear is mounted on the shaft 70 and keyed thereto the shaft will also rotate causing similar movement on the part of the pinions 74 and 75. Due to the meshing engagement of the teeth of these pinions with stationary racks 68, the shaft 70 will be caused to move up or down, depending upon the movement of the ram, and carry with it the block 67. Since lever 47 is pivotally supported by the block 67, the lever will be caused to move also. Since this lever 47 is pivoted to the upper end of push rod 50, the lever will swing about the pivots 48 and 66. When the control handle 61 is moved in a downward direction as previously mentioned, the rod 50 will be moved upward. This movement will cause lever 47 to swing upward about the pivot 66 transmitting upward motion to the spool 32. When the spool is moved in this direction from the position shown in Fig. 5, groove 42 in the spool will establish communication between grooves 33 and 34, permitting fluid pressure from the pressure source to flow to the upper end of the power cylinder. This fluid pressure will act on the piston in the power cylinder causing it and the ram 26, to move in a downward direction. Fluid exhausted from the lower end of the power cylinder by this motion will flow through groove 35 to groove 37 from which it will flow to the reservoir of the hydraulic system. As the ram 26 moves downward it will cause rack 77 to move likewise. This motion will cause pinions 74, 75, and 76 to rotate counter-clockwise, which will cause the block 65 to move downward and move the left end of lever 47 also in a downward direction. This motion of the lever will cause the spool 32 to move downward until communication between grooves 33 and 34 and between 35 and 37 is interrupted. Unless movement of the manual control handle 61 is continued, in order to maintain the spool 32 in position to continue the communication between the grooves mentioned, the interruption will occur as soon as movement of handle 61 is discontinued. When the handle 61 is raised, the valve spool 32 will be moved in a downward direction to connect the source of fluid pressure with the lower end of the power cylinder and the upper end of the latter with exhaust, at which time the ram will be caused to move in an upward direction. When the ram moves in this direction, it will tend to cause the valve spool to move in an upward direction to a closed position. This tendency will be overcome only by the continued upward movement of the operating handle 61.

It will be noted from Fig. 2, that as the bell crank 52 is rocked in a counter-clockwise direction the upper arm thereof approaches a substantially vertical position. As this position is approached, the vertical movement at the pivot 51 decreases while the downward movement of the outer end of lever 61 continues at substantially the same rate. This arrangement is employed to cause the upward motion transmitted to the push rod 50 and valve spool 32 to decrease as the handle 61 is depressed, thus when the ram 26 approaches the lower extremity of its potential travel, more movement of the control lever 61 will be necessary to effect travel of the ram. This arrangement provides a more sensitive control during the portion of the stroke of the ram during which the glass-forming operation takes place. To provide the operator with still more control, or, rather a knowledge of the force being exerted by the ram on the work, the rod 54 is provided with a plunger 79, which is pivotally connected with the bar 54 and arranged to have one end enter a chamber 80 formed in a block 81, pivotally mounted on the base 21. The chamber 80 is connected by a line 82 with the line 38 leading to the upper end of the power cylinder, so that when the upper end of the power cylinder is connected with the source of fluid pressure, the chamber 80 will also receive fluid under the same pressure which will act on the inner end of the plunger 79 and tend to resist movement thereof into the chamber 80. This resistance is transmitted through the rod 54 to the manual control handle 61. The operator is thereby apprised of the force being exerted by the ram 26.

In the formation of certain glassware in the press illustrated, a plastic mass of glass is introduced into a mold, then a forming die, carried by the ram is moved into the mold. This die engages the plastic mass and causes it to flow into the irregular recesses and cracks, the die continuing to advance until the ware forming cavity is completely filled. When hand operated presses are used the operator can tell by the feel of the operating element just how the glass is flowing and when the mold cavity is completely and correctly filled. He then eases up on the operating element a limited degree maintaining sufficient pressure to keep the die and mold in proper relation until the glass solidifies enough to prevent deformation of the article during removal. Due to the application of fluid pressure to the plunger 79 the operator secures a similar feeling from the handle 61 and when the mold cavity is properly filled, after the application of the necessary fluid pressure to the power cylinder 24, he eases up on the control handle 61 to permit the valve spool to move to the point at which the fluid pressure applied to the power cylinder will maintain the die in forcible engagement with the article undergoing formation After a predetermined interval of time the handle 61 is permitted to move up to its elevated position causing the withdrawal of the die from the mold. During the initial withdrawal of the die from the formed article it is important that the die move slowly to avoid subatmospheric pressures around the formed ware which might cause its collapse. Here again the realtively slow vertical movement of the pivot 51 of bell crank 52 serves a useful purpose. It permits the operating handle to be moved at a relatively rapid rate throughout the entire stroke but causes the ram to move gradually at first then increase in momentum after the die has been withdrawn from the mold.

It should be obvious that the type of motion transmitting connection between the movable valve element and the ram, or, the control handle may be varied in many ways. Figs. 6, 7, and 8 show different types of motion transmitting connections between the ram and the valve actuating lever 47. In Fig. 6, the lever 47 is pivotally connected to a follower 83 having a rolling engagement with a cam 84, this cam is pivoted as at 85 to a suitable support 86 and is revolved by a rack 87 connected to the arm 27, the rack 87 being in meshing engagement with a pinion 88 keyed, or, otherwise secured to the shaft for the cam 84. A coil spring 88 tends to return the follower to its lowered position or maintain its engagement with the cam 84. This mechanism operates in the same manner as the mechanism in the form of the invention first described. When the control handle is operated to raise the valve spool, the ram will be extended, this motion being transmitted back through the rack 87 and cam 84 to the lever 47 to cause the spool to be moved downward.

In Fig. 7, the left end of the lever 47 is moved by a motion transmitting mechanism including angular cam surfaces 90 formed in a block 91. This block is carried by the arm 27 and moves with the ram 26. The cam surfaces 90 are produced by forming an angular slot 92 in the block 91, this slot receiving a follower 94 carried by one arm 95 of a bell crank 96 pivoted as at 97 to the head 23. The second arm 98 of the bell crank is connected by a link 99 with the left end of the lever 47.

It will be seen that as the ram 26 lowers, the cam surfaces 90 will be moved to permit the bell crank 96 to rotate in a clockwise direction which will transmit counterclockwise movement to the lever 47; this movement will cause the valve spool 32 to move downward and discontinue the flow of fluid pressure to the upper end of the power cylinder. The action in this form of the invention is also similar to that in the preferred form.

In Fig. 8, the valve spool actuating lever 47-A is provided with a relatively long section at the left of the point where it is connected with the valve spool and the outer end of this section is connected by a link 100 with a block 101 carried by the ram 26. The action of this form of the invention is also similar to that of the preferred form, since it will be observed that the right end of the lever 47-A is elevated to cause the ram 26 to move downward, this motion of the ram will be transmitted by the block 101 and link 100 to the left end of the lever 47-A causing downward movement of the valve spool. This movement will interrupt the flow of fluid to the upper end of the power cylinder causing the ram to stop.

In all forms of the invention the valve acts as a slave for the power cylinder, movement of the valve initiating the movement of the latter which causes the valve to close. In all forms of the invention, it is necessary that the control handle be moved through a stroke of predetermined length to effect the complete stroke of the ram. If the control handle is moved a portion only of this stroke, the cam will move likewise. These motions take place almost simultaneously, but as the ram approaches the outer limit of its motion, more movement of the control handle is necessary to effect the same length of travel of the ram caused by a smaller amount of movement of the control handle at the beginning of the stroke of the ram. It will thus be seen that when the ram nears the portion of its stroke where the final forming operations are performed and the maximum forces are exerted, the control handle must be moved increased distances to secure equal degrees of ram travel. This arrangement makes the control mechanism more sensitive where the ram is at the critical ware-forming stage.

While the form of embodiment of the present invention as herein disclosed constitutes a preferred form, it is to be understood that other forms might be adopted, all coming within the scope of the claims which follow.

We claim:

1. Hydraulic apparatus comprising a reversible fluid motor having a movable element; a control member supported for movement in certain directions to cause movement of the motor element in the same directions; means for controlling the operation of said motor to cause the movable element thereof to move predetermined distances in proportion to the movement of said control member comprising a valve with an actuating lever connected thereto at its intermediate portion; motion transmitting means between said movable control member and one end of the actuating lever of said valve, movement of said control member serving to cause movement of the valve element in a certain direction; and a second motion transmitting means between the movable element of said motor and the other end of the actuating lever of said valve, motion of said motor element in response to movement of said control element in said certain direction serving to move the valve element in the opposite direction.

2. Hydraulic apparatus comprising a reversible fluid motor; a source of fluid pressure; control mechanism for said motor having a four-way valve with a movable element normally disposed in condition to prevent communication between said source of fluid pressure and said motor; means for operating said valve comprising a lever pivotally connected to the movable element of said valve; a pivotal support for said lever; manually actuated means for rocking said lever in one direction on said support to move said valve element to cause the operation of said motor in one direction; and means for transmitting motion from said motor to said support to move said lever in the opposite direction to cause said valve element to interrupt the operation of said motor.

3. Hydraulic apparatus comprising a reversible fluid motor having a movable element; a movable control element; means for causing the movable element of said motor to move in proportion to the movement of said control element comprising a valve with a movable member normally disposed in condition to prevent operation of said motor; a lever pivotally connected to the movable member of said valve; a pivotal support for said lever; motion transmitting means between said lever and said control element; and means actuated by the movable element of said motor for moving said pivotal support to move said lever in a direction opposed to that in which it is moved by said control element.

4. Hydraulic apparatus comprising a power cylinder having a ram; control means for said power cylinder, said control means having a four-way valve with a spool normally disposed in position to maintain said power cylinder inactive; a lever pivotally connected with said spool; motion transmitting means connecting said lever at one side of the connection with said spool, to said ram; a pivotally movable control element; and a second motion transmitting means connecting said control element and said lever at the other side of the connection thereof with said spool, said second motion transmitting means having a connection operative to reduce the amount of motion transmitted as the control element is moved in one direction and increase the same as the control element is moved in the opposite direction.

5. Hydraulic apparatus comprising a power cylinder having a ram; control means for said power cylinder, said control means having a fourway valve with a spool normally disposed in position to maintain said power cylinder inactive; a lever pivotally connected with said spool; motion transmitting means connecting said lever at one side of the connection with said spool, to said ram; a pivotally movable control element; and a second motion transmitting means connecting said control element and said lever at the other side of the connection thereof with said spool, said second motion transmitting means having a jointed connection operative to change the amount of motion transmitted as the control element is moved.

6. Hydraulic apparatus comprising a power cylinder having a ram; control means for said power cylinder, said control means having a four-way valve with a spool normally disposed in position to maintain said power cylinder inactive; a lever pivotally connected with said spool; motion transmitting means connecting said lever at one side of the connection with said spool, to said ram; a pivotally movable control element; and a second motion transmitting means connecting said control element and said lever at the other side of the connection thereof with said spool, said second motion transmitting means having a pivoted bell crank and push rod between said control element and said lever, the pivot for said bell crank being so located that the amount of motion transmitted to the lever for each unit of motion of the control element changes as the movement of the control element progresses.

7. Hydraulic apparatus comprising a power cylinder having a ram; control means for said power cylinder, said control means having a four-way valve with a spool normally disposed in position to maintain said power cylinder inactive; a lever pivotally connected with said spool; motion transmitting means connecting said lever at one side of the connection with said spool, to said ram; a pivotally movable control element; and a second motion transmitting means connecting said control element and said lever at the other side of the connection thereof with said spool, said second motion transmitting means having a pivoted bell crank; and a push rod pivotally connected to one arm of said bell crank and said lever, movement of said control element in one direction serving to move the point of connection between said push rod and bell crank toward a line extending through the pivot for said bell crank and the connection between said push rod and said lever.

8. Hydraulic apparatus comprising a power cylinder having a ram; control means for said power cylinder, said control means having a four-way valve with a spool element normally disposed in position to maintain said power cylinder inactive; a lever pivotally connected at its intermediate portion to said spool element; motion transmitting means connecting said lever at one side of the connection with said spool, to said ram; an operating member; a second motion transmitting means connecting said operating member and said lever at the other side of its connection with said spool; and means responsive to the admission of fluid pressure to said power cylinder to cause movement of said ram in one direction to oppose the movement of said operating member.

9. Hydraulic apparatus comprising a power cylinder having a ram; control means for said power cylinder, said control means having a four-way valve with a spool element normally disposed in position to maintain said power cylinder inactive; a lever pivotally connected at its intermediate portion to said spool element; motion transmitting means connecting said lever at one side of the connection with said spool, to said ram; an operating member; a second motion transmitting means connecting said operating member and said lever at the other side of its connection with said spool; a plunger connected with said second motion transmitting means; a chambered member for receiving said plunger; and fluid conducting means for introducing fluid pressure to the chamber in said member when said operating member is moved in one direction to oppose such movement.

10. Hydraulic apparatus comprising a reversible fluid motor having a movable element; means for controlling the operation of said movable element comprising a valve with a spool normally disposed in position to maintain said motor inactive; a lever connected at an intermediate point with said spool; a fulcrum at each end of said lever; selectively controlled means for moving one of said fulcrums to shift said spool to cause the operation of said motor; and motion transmitting means between the movable element of said motor and the other of said fulcrums, operation of said motor serving to move said other fulcrum to counteract the shifting of said spool by said manually operated means.

11. Hydraulic apparatus comprising a reversible fluid motor having a movable element; means for controlling the operation of said movable element comprising a valve with a spool normally disposed in position to maintain said motor inactive; a lever connected at an intermediate point with said spool; a block member mounted for movement in a direction substantially parallel to the axis of said spool, said lever being pivoted at one end to said block; a manually operated actuating means pivotally connected to the opposite end of said lever; and motion transmitting means between the movable element of said motor and said block member, operation of said manually operated actuating means serving to rock said lever about its connection with said block to cause the operation of said motor, movement of said motor element serving to rock said lever about its connection with said actuating means.

CECIL E. ADAMS.
VICTOR V. BLASUTTA.
HENRY V. MOG.

REFERENCES CITED

The following references are of record in the file of this patent:

UNITED STATES PATENTS

| Number | Name | Date |
|---|---|---|
| 1,855,434 | Vickers | Apr. 26, 1932 |
| 1,906,222 | Boland | May 2, 1933 |
| 2,466,796 | Crot | Apr. 12, 1949 |

FOREIGN PATENTS

| Number | Country | Date |
|---|---|---|
| 307,817 | Great Britain | Mar. 14, 1929 |